W. P. SENG.
LUBRICATOR FOR THE SPRINGS OF VEHICLES.
APPLICATION FILED JULY 8, 1916.
1,224,329. Patented May 1, 1917.
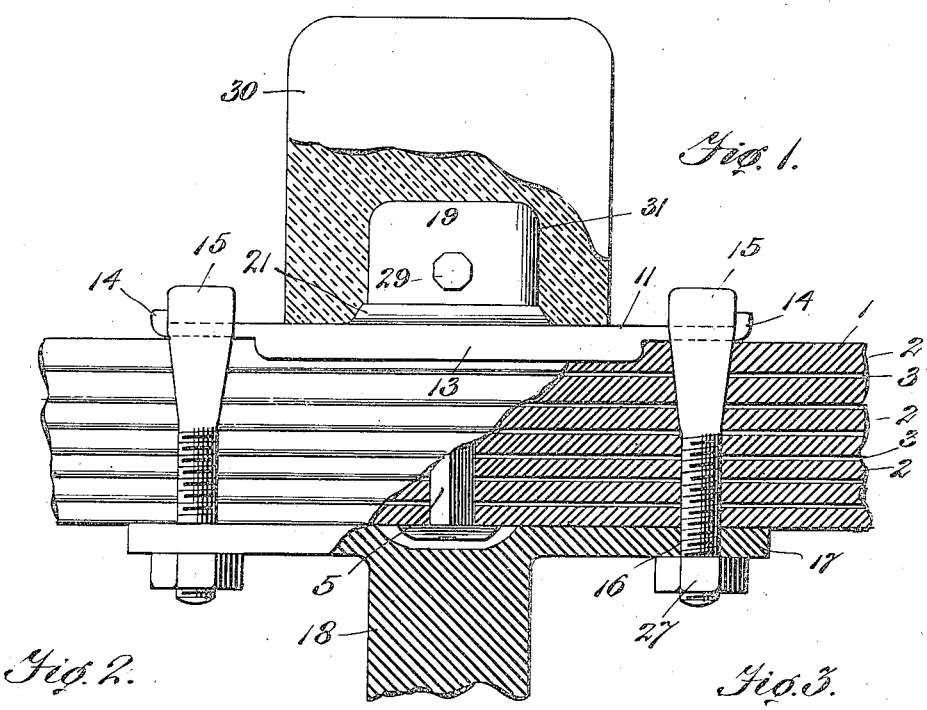
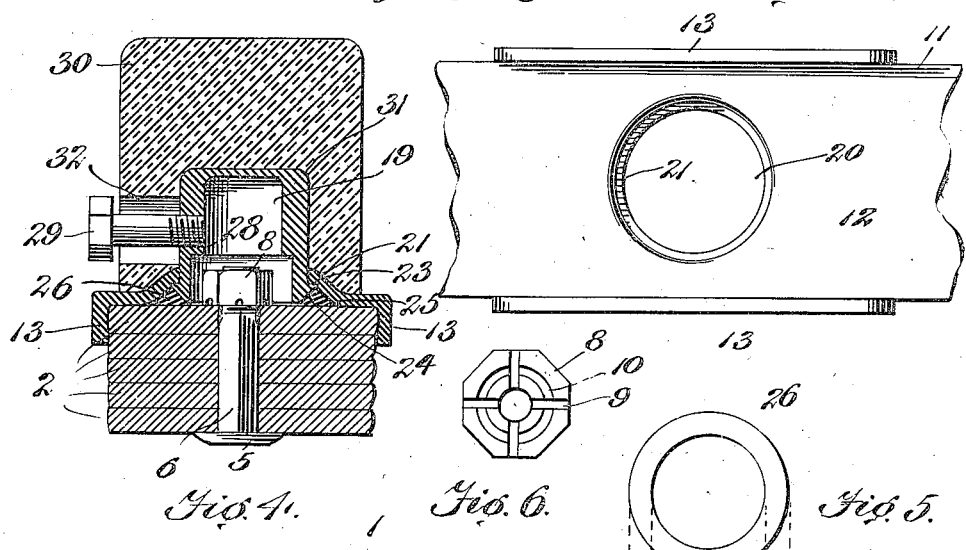
Inventor:
W. P. Seng,
by W. J. Duvall, Attorney.

UNITED STATES PATENT OFFICE.

WENDELIN P. SENG, OF CHICAGO, ILLINOIS.

LUBRICATOR FOR THE SPRINGS OF VEHICLES.

1,224,329.  Specification of Letters Patent.  Patented May 1, 1917.

Application filed July 8, 1916. Serial No. 108,236.

*To all whom it may concern:*

Be it known that I, WENDELIN P. SENG, a citizen of the United States, residing at Chicago, county of Cook, State of Illinois, have invented a new and useful Lubricator for the Springs of Vehicles, of which the following is a specification.

This invention relates to a means for conveniently and continuously lubricating the rubbing surfaces existing between the leaves of vehicle-springs, whereby to reduce friction and hence, breakage, and obviate the accumulation of rust.

The objects of my invention are to accomplish the above in connection with a clip-saddle for connecting the spring to the clip-plates of the axle.

Other objects and advantages of the invention will hereinafter appear, and the novel features will be particularly pointed out in the claims.

Referring to the drawing:

Figure 1 is a side elevation and partial section showing a fragment of a vehicle-spring mounted upon the axle of the vehicle and having applied thereto a spring clip-saddle constructed in accordance with my invention;

Fig. 2 is a transverse vertical section through the center of the clip-saddle, the axle being omitted;

Fig. 3 is a bottom plan view, with the ends broken away, of my improved clip-saddle;

Fig. 4 is a plan view of one of the leaves of the spring, the connecting bolt being shown in section and occupying its position;

Fig. 5 is a plan and section view combined showing the washer preferably employed and hereinafter referred to;

Fig. 6 is a bottom plan view of a form of nut preferably employed in connection with the bolt for connecting the leaves of the spring.

Similar numerals of reference indicate similar parts in all the figures of the drawing.

The spring 1, is of the usual embodiment and, therefore, consists of the several laminals or leaves 2. In each of the leaves, with the exception of the uppermost, there is formed in the upper surface a longitudinal groove 3. This groove may be given any desired disposition, but preferably extends from end to end of the leaf.

As is usual, the several leaves are further provided with a central bolt-hole 4, which extends throughout and transverse the entire series. In this bolt-hole is located the connecting or tie-bolt 5. In order to provide transverse ducts or passages through the leaves, the bolt 5 is preferably formed with an angular body-portion 6, whereby the walls of said bolt combine with the wall of the bolt-hole 4 to produce lubricating-ducts 7, which communicate with the aforesaid grooves 3. It will thus be seen that any lubricant introduced into the ducts 7 will find its way by means of the grooves 3 to the rubbing surfaces between the leaves, from which grooves the lubricant will overflow and spread.

For the purpose of giving access by the lubricant to the ducts 7 from any source of lubricant-supply, I preferably employ and thread upon the upper cylindrical end of the bolt 5, a nut 8 (see Fig. 6). This nut may be provided with radial grooves 9, and communicating annular grooves 10, said grooves being formed on the underside of the nut.

The clip-saddle 11, is preferably, though not necessarily, stamped from sheet metal of suitable gage, and it comprises an oblong body-portion 12, corresponding in width to that of the spring, and at its opposite longitudinal sides said body-portion is preferably provided with depending spring embracing flanges 13. The ends of the body-portion may be upturned as at 14, if desired, left plain or given any other shape or configuration. When upturned as shown, however, convenient shoulders are produced against which the usual clips 15 may be readily positioned. These clips are of the usual formation, and it will be understood that their terminals embrace the opposite sides of the spring and extend through suitable openings 16, in the clip-plate 17 formed in any usual manner, as for instance upon the axle 18.

At the center of the body-portion of the saddle-plate, and communicating with the bolt-hole 4, is located upon and extends upwardly from the plate a lubricant-reservoir 19. In the present embodiment of my invention, I have shown the lubricant-reservoir and the saddle-plate as formed separately and connected together in a manner hereinafter described, but it will be understood that these parts may be formed integral, it being within my invention, where sheet-metal is employed, to stamp the saddle-plate and the lubricant-reservoir in one piece. In the present instance, I provide the saddle-plate with a central circular opening 20, the metal about the opening being punched upward to form a surrounding annular flange 21. Within this opening is seated the cylindrical lubricant-reservoir 19, the lower edge of which is surrounded by a shoulder 23, below which point said reservoir is beveled, as at 24. This shoulder 23 is annularly larger than the flange 21, and interlocks therewith, as best shown in Fig. 2. The shoulder 23 and the flange 21 combine to form a space 25, which is circular and in cross-section substantially triangular. Within this space any suitable packing may be located, but I prefer to employ a packing-ring 26, formed of lead and shown in detail in Fig. 5. A ring of this character introduced into the packing-space between the reservoir and saddle-plate will, when the nuts 27 of the clips are rotated to clamp the parts, be spread into a shape corresponding with the packing-space and constitute a secure packing for preventing the lubricant from escaping.

Any means desired may be provided for introducing lubricant to the reservoir 19, but in the present instance I have merely shown said reservoir with a threaded orifice 28 in which is seated a plug 29. It will be obvious that this plug is merely a closure, and after being removed an oil-can or grease-gun may be introduced through the orifice and into the reservoir for filling the latter.

I may utilize the reservoir 19 for the purpose of forming a support for the usual rubber bumper 30, though I do not limit my invention to such an inclusion. This means will, however, be found very convenient, and serve the purpose without any other mode of fastening. When thus combined, the bumper is provided in the underside of its base with a cavity 31, corresponding to the external shape of the reservoir 19. It is further provided with a laterally disposed passage 32, which communicates with the cavity 31 and is formed at a right angle thereto. The passage 32 is for the accommodation of the closure 29. This passage is preferably formed elongated, its greatest width being vertical, this for the purpose of obviating any liability of the bumper injuring or loosening the closure 29 when after compression said bumper rebounds.

Any character of lubricating-duct may be substituted for that shown, such, in the present instance, forming no part of my invention. The one shown, however, is believed the best and simplest, and, hence the cheapest, as the leaves of vehicle-springs are always formed with the circular bolt-hole for the accommodation of the tie-bolt, and to produce the ducts it is only necessary to substitute for the latter the bolt having an angular body-portion.

Having described my invention, what I claim, is:

1. The combination with the leaves of a vehicle-spring, the same having a transverse lubricating-duct communicating with the rubbing-surfaces between the leaves, a clip-saddle mounted on the spring and provided with an opening, a lubricant-reservoir extending upwardly through the opening and at its lower open end interlocking with the edge thereof, and spring-clips adapted to extend through the usual clip-plates and having nuts at their lower ends.

2. The combination with the leaves of a vehicle-spring, the same having a transverse lubricating-duct communicating with the rubbing-surfaces between the leaves, a clip-saddle mounted on the spring and provided with an opening, a lubricant-reservoir extending upwardly through the opening and at its lower end interlocking with the edge thereof, a packing-washer interposed between the lower end of the lubricant-reservoir and the spring, and spring-clips adapted to extend through the usual clip-plates and having nuts at their lower ends.

3. The combination with the leaves of a vehicle-spring, the same having a transverse lubricating-duct communicating with the rubbing-surfaces between the leaves, a clip-saddle mounted on the spring and provided with an opening having an upwardly disposed surrounding flange, a lubricant-reservoir extending upwardly through the opening and at its lower end having an annular shoulder engaging the flange of the clip-plate, a packing interposed between the bottom of the reservoir and the saddle, and spring-clips adapted to extend through the usual clip-plates and having nuts at their lower ends.

4. The combination with the leaves of a vehicle-spring, the same having a transverse lubricating-duct communicating with the rubbing-surfaces between the leaves, a clip-saddle mounted on the spring and provided with an opening, a lubricant-reservoir extending upwardly through the opening and provided at its lower end with an annular external shoulder engaging the edge of the same and below the shoulder provided with an inclined face combining with the edge of the opening to form an annular space, a washer located in said space, and spring-clips embracing the saddle and the springs and at their lower ends adapted to extend through the usual clip-plate and provided with nuts.

5. The combination with the leaves of a vehicle-spring, the same having a transverse lubricating-duct communicating with the rubbing-surfaces between the leaves, a clip-saddle provided at its center with an upwardly disposed lubricant-reservoir communicating with said duct and having an opening in its wall, a closure for the opening extending laterally from the reservoir, spring-clips mounted on the saddle and at their lower ends adapted to extend through the usual clip-plates and provided with nuts, and a rubber-bumper having its underside recessed or chambered to fit the lubricant-reservoir and mounted upon the same and provided with a laterally disposed orifice transversely elongated to receive the closure of the reservoir and at its inner end communicating with the recess or chamber.

In testimony whereof I have signed my name to this specification in the presence of two subscribing witnesses.

WENDELIN P. SENG.

In the presence of—
   Geo. F. Hassel,
   W. H. Potter.